May 19, 1970  C. C. WHITE ET AL  3,512,347
TRACTOR MOUNTING HITCH FOR SWATHER HEADER PLATFORM
Filed Feb. 20, 1967  2 Sheets-Sheet 1
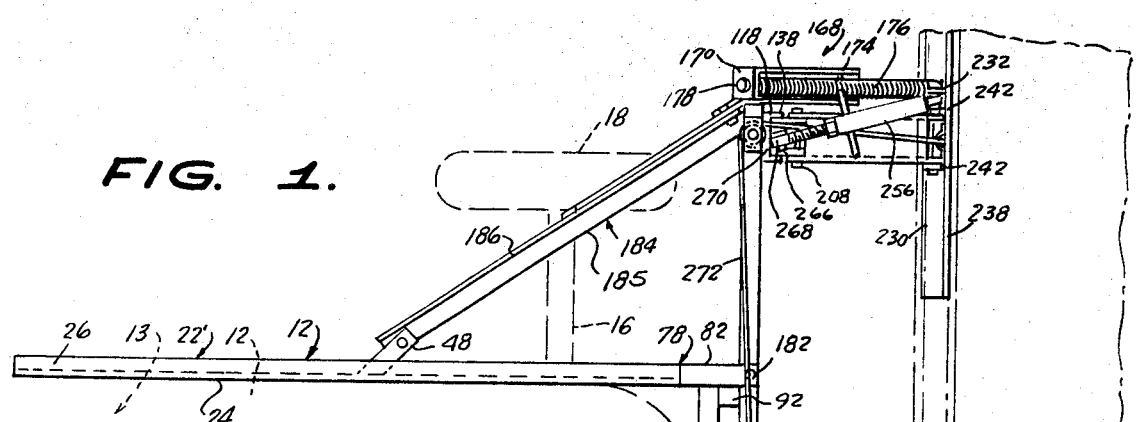
FIG. 1.
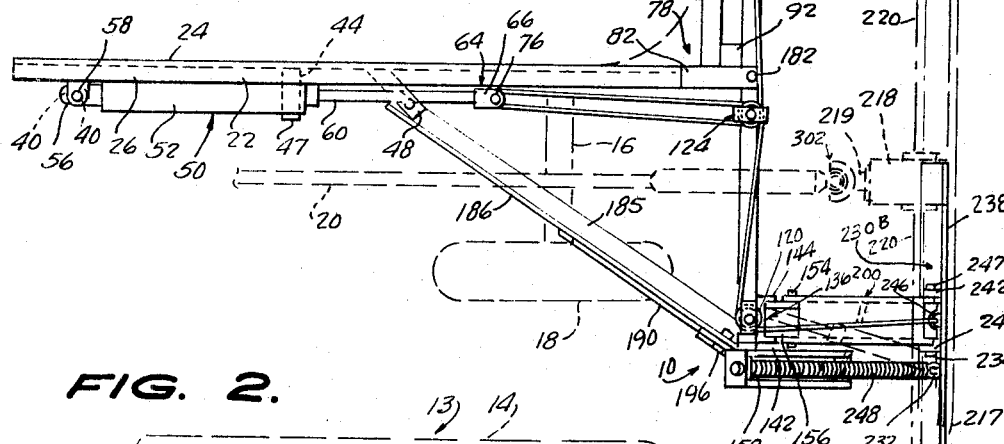
FIG. 2.
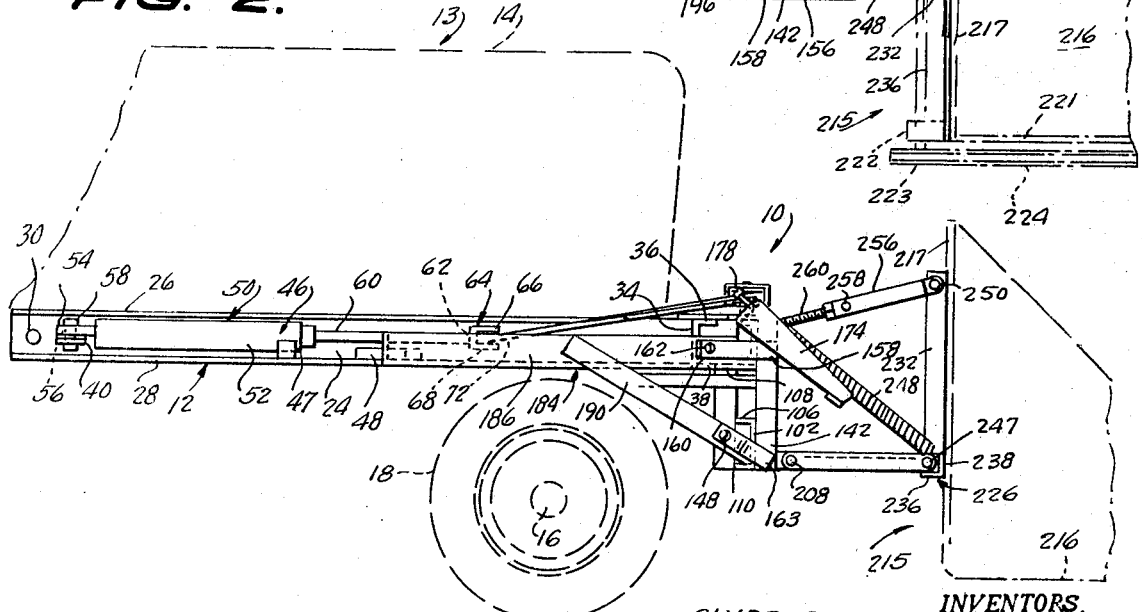
INVENTORS.
CLYDE C. WHITE,
DALLAS L. WHITE,
BY Kimmel, Crowell & Weaver
ATTORNEYS.

INVENTORS.
CLYDE C. WHITE,
DALLAS L. WHITE,
BY Kimmel, Crowell & Weaver
ATTORNEYS.

United States Patent Office 3,512,347
Patented May 19, 1970

3,512,347
TRACTOR MOUNTING HITCH FOR SWATHER HEADER PLATFORM
Clyde C. White, New Cambria, Kans. 67470, and Dallas L. White, 1926 Ingman Road, Salina, Kans. 67401
Filed Feb. 20, 1967, Ser. No. 617,167
Int. Cl. A01d 67/00
U.S. Cl. 56—208          2 Claims

ABSTRACT OF THE DISCLOSURE

Apparatus to connect a swather header platform with a farm tractor and including means to change the angle of inclination of the swather header platform relative to a ground plane and to floatingly support the platform thereover.

BACKGROUND OF THE INVENTION

A swather header platform is a relatively common farming unit which is usually found in conjunction with various harvesting machines. Generally speaking, a swather is a farm implement having a long cutter bar for cutting grain and seed crops and dropping them into a windrow for curing before the crop is gathered and thrashed. In conventional practice, the swather is utilized as an attachment to a mower which turns the swath into a windrow behind the mower wheels. This is conventional in the art.

Accompanying the rapid progress of current agricultural techniques has been the growing recognition of the desirability of utilizing the swather implement as a unit separate and apart from the usual farm equipment found in combination therewith. To this end, there has been developed it the United States a self-propelled farm swather. It will be immediately recognized by those skilled in the arts of husbandry that such an integrated unit, while well serving its intended use and functions, represents a sizable outlay of capital in a first instance, and secondly, that the self propelled unit includes as a basic component thereof, essentially a duplication of a prime mover (a tractor) to be found on most farms, especially those of any size. Despite the fact that mechanical and hydraulic power sources and controls therefor may be found on most conventional farm tractors and which find their counterparts in the self propelled swather unit, and not withstanding the recognition by the agricultural implement manufacturing industry of the desirability of utilizing a swather as an implement aside and apart from the usual implement complex with which the swather is usually associated, no effort has been made to develop a hitch to provide means for detachably connecting and operatively driving a swather on and by a conventional farm tractor.

It is, therefore, one of the primary objects of this invention to provide a hitch for detachably connecting a swather farming implement on a conventional farm tractor and to utilize the mechanical and hydraulic power sources available thereon to operate the component elements of the swather in the usual manner.

Another object of this invention is to provide a hitch for detachably connecting a swather implement with a tractor wherein the hitch includes an auxiliary chassis adapted for connection with the chassis of a conventional farm tractor and including framework means carried on the auxiliary chassis and connected with the swather header platform in such a manner to afford adjustment of the latter relative to a ground plane.

A further object of this invention is to provide hitch means generally described supra, wherein the framework comprises a primary and secondary frame and wherein means are afforded whereby the secondary frame may be vertically adjusted relative to the primary frame to obtain the desired positioning of the swather header platform relative to a ground plane.

Still another object of this invention is to provide a hitch of the type to which reference has been generally made above wherein further means of an adjustable type are provided to control the degree of angularity of the swather header platform relative to the aforementioned ground plane.

This invention has, as still another object thereof, the provision of a hitch for a swather header platform adapted for connection to a conventional farm tractor chassis and wherein the aforesaid hitch includes means for floatingly supporting the swather header platform above the desired ground plane or level.

This invention contemplates as yet another object thereof, the provision of a tractor mounting hitch for a swather header platform which is non-complex in construction and assembly, inexpensive to manufacture and maintain, and which is rugged and durable in use.

Other and further objects and advantages of the instant invention will become more apparent to those skilled in this art from a consideration of the following specification when read in light of the accompanying drawings.

SPECIFICATION

In the drawings:

FIG. 1 is a top plan view of a tractor mounting hitch for a swather header platform constructed according to this invention;

FIG. 2 is a side elevational view of the hitch shown in FIG. 1; and

Figure 3:
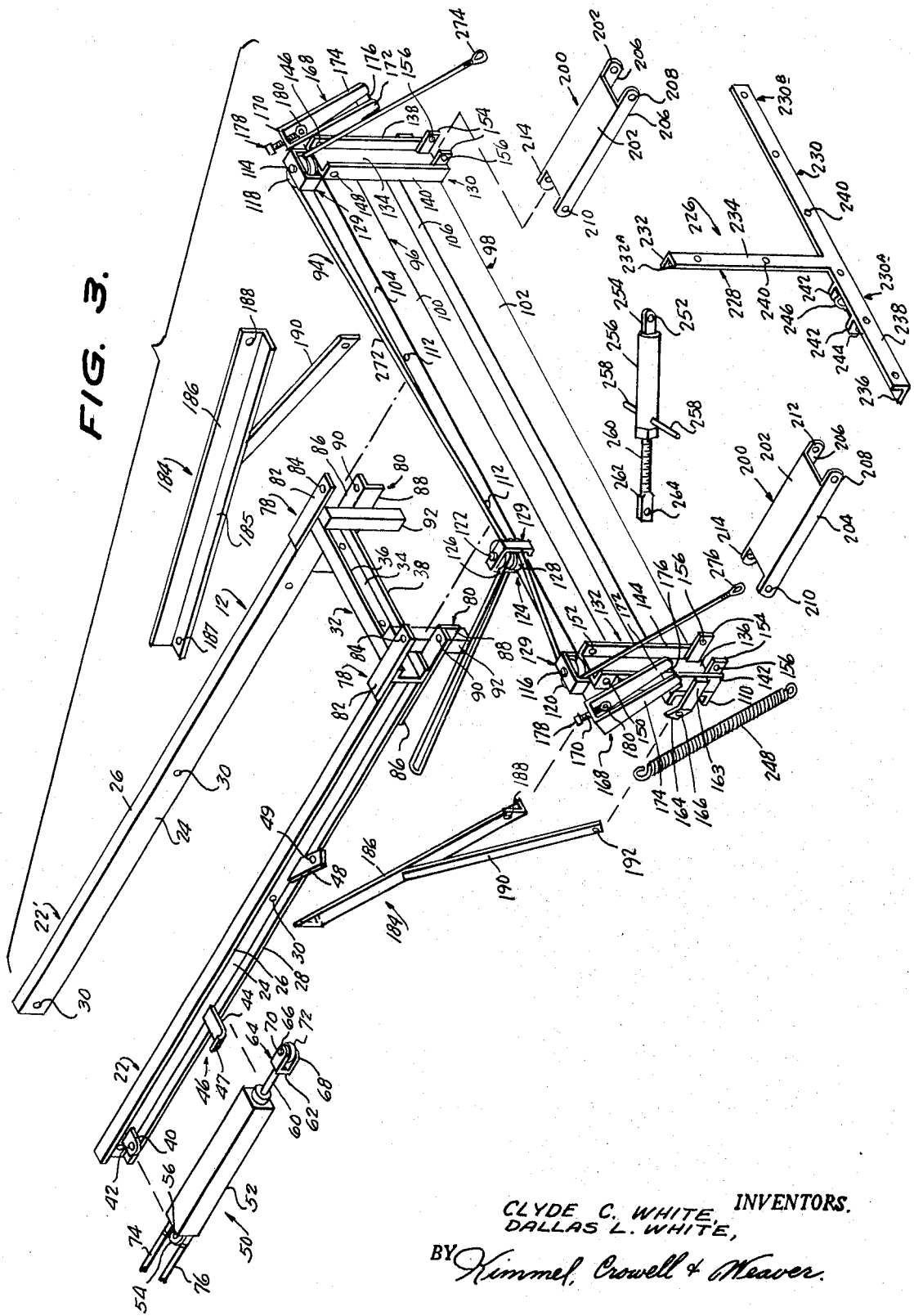
FIG. 3 is an exploded perspective view of the tractor mounting hitch for the swather header platform.

Referring now more specifically to the drawings, reference numeral 10 designates, in general, a tractor mounting hitch for a conventional swather header platform, the hitch being constructed in accordance with the teachings of this invention. As such, the hitch 10 is seen to comprise an auxiliary substantially U-shaped chassis 12 adapted for releasable connection with the chassis (not shown) of a conventional farm tractor 13, portions of the latter being shown in phantom lines in FIGS. 1 and 2 to lend understanding to this invention. Insofar as this intelligence is necessary, reference numeral 14 indicates the usual tractor motor, and numeral 16 refers to the front axle on the opposed ends of which are rotatably mounted the front wheels 18. Also shown in phantom lines and comprising a conventional part of the tractor 13 is a forwardly extending power take-off shaft 20 to which further reference will be made.

The auxiliary chassis 12 is seen to comprise a pair of laterally spaced substantially parallel identically constructed confronting channel-shaped side frame members 22, 22' each having an upright elongated bight 24 from which laterally project a pair of verticaly spaced sidewalls 26, 28. The side frame members 22, 22' are extended along and are engaged against the forward end portions of the tractor side frame members (not shown) to which they are detachably connected by means of bolts (not shown) that are passed through the transversely extending bolt holes 30 formed in each bight 24 at longitudinally spaced intervals.

The forward ends of the side frame members 22, 22' are connected by conventional means to the opposed ends of a channel-shaped end frame member or bight frame member 32 having an upright bight 34 and forwardly facing laterally projecting vertically spaced sidewalls 36, 38. As is seen in the several figures of the drawings, the upper and lower sidewalls 26, 36 and 28, 38, respectively, are flush with one another to serve a function to which reference will be made infra.

To the bight 24 of one of the side frame members, here shown as the side frame member 22, and adjacent the rear end thereof, is fixedly connected a laterally projecting lug 40 centrally apertured as at 42, and forwardly of the lug 40 and to the sidewall 28 of the same side frame member 22 is fixedly connected the outer end of the leg portion 44 of an L-shaped spring bracket 46. The inner end of the leg portion 44 terminates in an upwardly extending foot section 47. Also projecting laterally from each chassis side frame member 22, 22', and intermediate their respective ends, is a forwardly diverging trapezoidal connector plate 48 having an end thereof fixedly connected to the sidewalls 28 and with their respective other ends formed with a transversely extending opening 49.

At 50 is designated a conventional hydraulic cylinder having an elongated substantially rectangular casing 52. From one end of the casing 52 longitudinally extends a lug 54 having an aperture 56 extending transversely therethrough. The lug 54 is superimposed on the lug 40 with the apertures 56 and 42 aligned to receive the bolt 58 therethrough thereby pivotally connecting the hydraulic cylinder 50 to the side frame member 22 for movement about a normally vertical axis.

The other end of the casing 52 is normally releasably received in the bracket 46, as is shown in FIGS. 1 and 2, and from this end longitudinally projects the usual reciprocable piston rod 60. The outer end of the piston rod 60 is fixedly connected to the bight 62 of a clevis 64 having arms 66, 68 on which the opposed ends of a shaft 70 are mounted and supported. The shaft 70 in turn, carries a grooved pulley 72 to which further reference will be made.

Hydraulic fluid conduits 74, 76 connect the hydraulic cylinder 50 to an operator controlled hydraulic system conventional in the tractor art, a control valve (not shown) being connected in the system to control the hydraulic cylinder 50 all in the usual manner.

Extending longitudinally of the forward ends of the sidewalls 26, 28 of each chassis side frame member 22, 22' and transversely across and beyond each adjacent end of the sidewalls 36, 38 of the chassis end frame member 32 is, respectively, an extension member 78, 80. The extension member 78 comprises an elongated substantially rectangular plate 82 having an opening 84 extending transversely through its extended end, and the other extension member 80 comprises an angle iron having one of its flanges 86 fixedly connected to the aforementioned sidewalls 28, 38 and a depending flange 88. The angle irons 80 open away from one another with their respective flanges 88 confronting each other. Each flange 86, at its extended end, is provided with a transverse opening 90, the openings 84, 90 being aligned with one another.

The upper end of a vertically elongated substantially rigid rectangular spacer block 92 is fixedly connected, respectively, in and to each of the corners formed at the intersection of the extension members 78, 80 with the adjacent ends of the chassis end frame member 32, and each block 92 has an end depending below the lower ends of the flanges 86.

The hitch 12 further includes a framework comprising a horizontally elongated normally upright primary frame 94 comprising a pair of identically constructed normally horizontal, vertically spaced and substantially parallel upper and lower channel members 96, 98, respectively. The channel members 96, 98 comprise, respectively, bights 100, 102 from the longitudinally extending marginal edges of which rearwardly project their respective top and bottom sidewalls 104, 106 and 108, 110.

The upper sidewall 104 is provided with a plurality of longitudinally spaced transversely extending openings 112 (see FIG. 3) and similar openings (not shown) are formed in the sidewall 108 aligned with the openings 112, the functions of these aligned openings to be made clear below. To the sidewall 104 and adjacent each end thereof is fixedly connected, respectively, one of the ends of a pair of upright pulley shafts 114, 116 on which the pulleys 118, 120 are rotatably mounted. Still further, and again with reference to FIG. 3 of the drawings, the sidewall 104 is seen to serve as mounting means for one end of a third pulley shaft 122 disposed adjacent to but spaced inwardly from the shaft 116. This last mentioned pulley shaft has a third pulley 124 journaled for rotation thereon, the pulley 124 being double grooved as at 126, 128 to serve a function to be described. Any conventional bracket means 129 connected to the channel member 96 will serve as journals for the upper ends of the pulley shafts 114, 116 and 122.

Extending transversely across the opposed adjacent pairs of the ends of the channel members 96, 98 are normally upright channel members 130, 132, respectively, each channel member 130, 132, having their respective bights 134, 136 fixedly connected to adjacent portions of the bights 100, 102. From the longitudinally extending marginal edges of the bights 134, 136, forwardly project the pairs of sidewalls 138, 140 and 142, 144, respectively. Each of the sidewalls 138, 140 and 142, 144 are apertured as at 146, 148 and 150, 152, repsectively. As is seen in FIG. 3, the lower end of each sidewall 138, 140, 142 and 144 has one end, respectively, of a plurality of substantially identical rectangular connector plates 154 fixedly connected thereto, the other ends of the plates 154 having a transversely extending opening 156 formed therein with the openings 156 being coaxially aligned with one another. To the upper end of each of the sidewalls 138, 142, is fixedly secured the foot section 158 of a first L-shaped strap, the leg portions 160 of each strap each being apertured adjacent their outer end as at 162. As is seen in FIG. 1 of the drawings, the leg portions 160 of these first straps converge rearwardly and in the direction of the auxiliary chassis. To these same sidewalls 138, 142 and adjacent their lower outer sides is fixedly secured the foot section 162 of second L-shaped strap members having upwardly and rearwardly converging leg portions 164 apertured adjacent their respective outer ends as at 166.

Each reference numeral 168 denotes one of a pair of inverted substantially U-shaped saddles each saddle 168 includes a bight 170 from the opposed ends of which laterally project the forwardly extending arms 172, 174, and across the outer ends of the latter is fixedly secured a crossbar 176. As is seen in the several figures of the drawings, the longitudinal axes of the arms 172, 174 of each saddle 168 are inclined at an acute angle with respect to a horizontal plane, and each saddle 168 is secured in this inclined position by fixedly connecting each of their respective arms 172 with one of the foot sections 158 at opposite ends of the frame 94. Reference numerals 178 each designate an elongated adjustment bolt, each of the bolts being threaded, respectively, through one of the bights 170, and each of the bolts 178 terminate at their respective inner ends in annular connectors 180, the function of the connectors 180 to be explained in more detail below.

The framework 94 is supported on and connected to the auxiliary chassis 12 by slidingly engaging the channel member 96 between the extension member 78, 80. In effecting this assembly the sidewall 108 is superimposed on the flanges 86 with the sidewall 104 being positioned below the outer ends of the extension members 78. In this position, the openings 112 formed in the sidewall 104 and the corresponding openings (not shown) formed in the sidewall 108 are moved into alignment with the aligned openings 84, 90 provided in, respectively, the extension members 78, 80. Thereafter, lock bolts 182 (see FIG. 3) are passed through each series of aligned openings to which reference has just been made. In this position, the rearwardly facing outer edges of the sidewalls 104, 106, 108 and 110 engage the adjacent sides of the spacer blocks 92 and, as is seen in FIG. 2 of the drawings, the channel members 130, 132 extend in laterally spaced and vertical parallel relationship relative to each other.

Reference numerals 184 each designate an angle member comprising a lateral flange 185 and a normally upright flange 186. The lateral flanges 185 are each formed, adjacent an end thereof, with the transversely extending opening 187 and each of the upright flanges 186, adjacent the other end of each angle member 184, is formed with the transversely extending opening 188. Fixedly secured to each of the upright flanges 186 intermediate the ends thereof is one of the ends, respectively, of a pair of elongated substantially rectangular flat trusses 190, the other ends of the trusses 190 being inclined downwardly from their associated angle members 184 and having an opening 192 formed therein.

As is seen in FIG. 1 of the drawings, each lateral flange 185 is extended below one, respectively, of the connector plates 48 with the openings 49, 187 aligned with one another to receive connector bolts 194 therethrough. The other ends of the angle members 184 and trusses 190 diverge laterally and forwardly with respect to the auxiliary chassis 12 to bring the openings 188 into alignment with the openings 162 and the openings 192 into alignment with the openings 166. Thereafter, bolts 196 connect each of the leg portions 160 of the first straps with the adjacent one of the flanges 186, and bolts 198 extending through the aligned openings 192, 166 connect the leg portions 164 of the second straps with the adjacent ends of the trusses 190.

Reference numerals 200 each designate inverted, substantially U-shaped connector levers each having a bight 202 from the longitudinally extending marginal edges of which downwardly depend (see FIG. 3) the laterally spaced and substantially parallel side arms 204, 206. As is seen in FIG. 3 of the drawings, the side arms 204, 206 have opposed ends which extend beyond the adjacent ends of the bights 202, and these extended ends of the arms 204, 206 are each provided with transversely extending openings 208, 210 and 212, 214, respectively. The extended ends of the arms 204, 206 at one end of each lever 200 is extended between the pairs of connector plates 154, respectively, with the openings 210, 214 aligned with the openings 156 to receive pivot pins 208 (see FIG. 2) therethrough whereby each of the connector levers 200 is pivotally connected on their associated connector plates 154.

Reference numeral 215 generally designates a conventional swather platform having the usual normally horizontal bed 216 from the back longitudinally extending marginal edge of which upwardly projects a normally upright back wall 217. The swather platform 215 is conventional in construction, and the component elements thereof also include a gear box 218 which is normally affixed to the upper end of the back wall 217 intermediate the ends thereof to project laterally rearwardly therefrom. The gear box 218 is provided with the conventional mechanical input shaft 219, and the output from the gear box 218 is transmitted via the opposed drive shafts 220 toward the sidewalls 221. Journals 222 supported from the back wall 217 carry the outer ends of the shafts 220 and these outer ends have fixedly secured thereto drive pulleys 223 (only one being shown) about which are trained drive chains 224 connected to the operative mechanism of the swather, all in the usual manner.

The framework according to this invention further includes a pair of inverted substantially T-shaped frames 226 (see FIGS 1 and 3), each frame 226 comprising a normally upright angle member forming a stem 228 and a crosshead 230 also comprising an angle member. The stem 228 includes the arms 232, 234, and the lower end of the stem 228 at its point of intersection with its crosshead 230 divides the crosshead 230 into the two end portions 230A, 230B having the continuous arms 236, 238.

The frame members 236 are connected to the back wall 217 adjacent each end thereof, the arms 234, 238 fitting flush thereagainst and being fixedly secured thereto as by rivets (not shown) or other conventional connecting means which extend transversely through the openings 240 formed in the arms 234, 238.

Fixedly secured in the corner formed by the intersection of the arms 236, 238 and located on the cross head end 230B (see FIGS. 1 and 3) are a pair of upright lugs 242 having transversely extending central openings 244 formed therein. Disposed between each adjacent pair of lugs 242 and fixedly secured to the arm 238 is a rearwardly projecting eye 246, the function of which will be described below.

As is seen in FIG. 1, the other ends of the arms 204, 206 of the levers 200 are inserted between, respectively, each pair of lugs 242 and are pivotally connected thereto by pivot pins 247.

Reference numerals 248 each designate an elongated helicoidal spring under compression. As is see in FIGS. 1 and 2, one of the respective ends of each of the springs 248 is connected with one, respectively, of the annular connectors 180, the other ends of the springs 248 extending transversely across the crossbar 126 of its associated saddle 168 for connection to the lower end of the arms 232. Pivot pins 250 extend through an opening 232A formed in each of the arms 232 and through an opening 252 formed in the outer end of each tongue 254 the inner ends of the tongues 254 being fixedly connected to one end of an internally threaded casing 256 having handle means 258 projecting radially from diametrically opposed sides thereof and adjacent its other end.

Threaded into the aforementioned other end of each casing 256 is an elongated externally threaded adjustment bolt 260, the outer end of each bolt 260 terminating in a tongue 262 projecting longitudinally therefrom and having an aperture 264 extending transversely therethrough (see FIG. 3). Each opening 264 receives a bolt 256 therethrough, the bolts 256 pivotally connecting their respective associated tongues 262 to one of the lips 268, each lip 268 projecting laterally from a substantially rectangular base 270 of a conventional bracket, and the bases 270 are fixedly connected to each of the bights 134, 136, respectively, of the upright channel members 130, 132 adjacent the upper ends thereof. As is seen in FIG. 1, the lips 268 are bent at an acute angle relative to their respective bases in order to diverge away from one another and in a direction forwardly of the auxiliary chassis 12. Due to the angularity of the longitudinal axis of the adjustment bolt 260 and its casing 256, the connection between the tongue 254 and its associated pivot pin 250 is loose or, as is known in the vernacular of mechanics, it is a "sloppy" connection. This is necessary in order to prevent a binding of each of the tongues 254 with its respective associated arm 232.

Adjustment of the casings 256 axially of their respective bolts 260 changes the effective length of these connector means whereby the platform 215 is caused to move to an adjusted pivotal position relative to the horizontal axis of the bolts 247.

With the component elements of the hitch assembled and connected as thus far described, means are provided to effect the elevation and downward movement of the swather header platform in order to utilize the same in the conventional manner. To effect this operation flexible cable means 272 is provided. Referring now more specifically to FIG. 3 of the drawings, one end of the flexible cable means 272 terminates in a loop 274 which is connected with one of the eyes 246 carried by the arm 238 of one frame member 226, and the other end of the cable means 272 is trained about the adjacent pulley 218 and around the uppermost groove 126 of the pulley 124. This last named end of the cable 272 is also trained about the pulley 72 carried on the free end of the piston rod 60, and this end of the cable 272 is then threaded around the lower groove 128 of the pulley 124. This end of the cable 272 is extended to pass around the pulley 120 and terminates in a second loop 276 which is connected with the other of the eyes 246 on the other of the frame members 226. From the foregoing specification it now becomes obvious that as the hydraulic system of the tractor is operated to cause the piston rod 60 to move to an extended position, the cable 272 pays out, the effective length of the flexible cable 272 between its two ends 274, 276 being lengthened whereby the swatcher header platform 215 may be pivoted to a lower position about the pivot pins 208. The reverse is, of course, true since operation of the hydraulic cylinder 50 causing its piston rod 60 to retract will effect a cable take-up and consequently, the elevation of the platform.

Mechanical power for driving the movable elements of the swather 215 is derived by means of the power take-off shaft 20 which is operatively connected through a universal connector 302 with the power input shaft 219 of the gear box 218.

The tractor hitch described above and illustrated in the accompanying drawings may be easily disconnected from the tractor chassis through the simple expedient of removing the bolts which connect it thereto from the bolt holes 30 and backing the tractor from between the chassis side frame members 22, 22'. Connection of the hitch with the farm tractor is easily accomplished through the practice of the same steps but in the reverse order.

It will be readily understood that with the platform 215 hitched to the tractor and rendered operable as described above, the resilient springs 248 serve to support the platform over a horizontal ground plane, the support being one which exerts, constantly, a pull force on the platform 215 to, in effect, float it thereover. In the absence of such resilient means, the lowering of the platform to the ground could cause it to exert sufficient pressure so that it would tend to dig the turf. With the spring means 248 installed it has been found that it is possible to entirely release all pressure on the hydraulic cylinder 50 and the platform 215 will float lightly over the surface of the ground.

Having described and illustrated one embodiment of this invention in detail, it will be understood that the same is offered merely by way of example.

What is claimed is:

1. A hitch for releasably connecting a swather header platform on one end of a tractor chassis, said swather header platform having a normally horizontal bed and a normally upright back wall provided with upper and lower ends and opposed sides, said hitch comprising:
    a substantially U-shaped chassis comprising a bight member and a side frame member projecting laterally from each respective end thereof, said side frame members being adapted to extend on opposite sides of said tractor chassis for releasable connection thereon and with said bight member extending transversely thereacross adjacent its said one end;
    a primary frame comprising a pair of vertically spaced transversely extending and substantially parallel frame members and a pair of vertically extending transversely spaced and substantially parallel end frame members, each of said end frame members extending across and being rigidly connected, respectively, to the adjacent pairs of ends of said transversely extending frame members;
    means projecting from said bight member at each respective end thereof to receive portions of the uppermost one of said transversely extending frame members therein for releasable connection thereon;
    a lever for each vertical frame member and means pivotally connecting one end of each of said levers to, respectively, the lower end of each vertical frame member;
    a pair of connector means, each of said connector means having opposed ends, and means for selectively adjusting each of said connector means to change the effective axial length thereof;
    means pivotally connecting one end of each of said connector means on, respectively, each of said vertical frame members adjacent its upper end;
    a pair of inverted substantially T-shaped frames each having a stem and a crosshead, and means fixedly connecting each T-shaped frame on the back side of said back wall;
    means pivotally connecting the other ends of each of said levers on, respectively, one of said crossheads;
    means pivotally connecting the other ends of said connector means on, respectively, each of said stems;
    pulley means on the uppermost one of said longitudinal frame member;
    a flexible cable trained around said pulley means having its ends, respectively, connected with one of said crossheads; and
    means on one of said side frame members connected with said cable and selectively operable to take up or pay-off the same.

2. A hitch as defined in claim 1 wherein:
    said last named means comprises a hydraulic cylinder having an extendible and retractable piston rod; and
    pulley means fixed on said piston rod for reciprocal movement therewith, said pulley means having a portion of said cable trained therearound.

References Cited

UNITED STATES PATENTS

| | | | |
|---|---|---|---|
| 2,501,424 | 3/1950 | Ufer | 56—23 |
| 2,674,082 | 4/1954 | Ryden | 56—23 X |
| 2,700,859 | 2/1955 | Vigum et al. | 56—208 X |
| 2,899,776 | 8/1959 | Arnold | 172—484 X |
| 3,043,076 | 7/1962 | Scheidenhelm | 56—210 X |
| 3,230,694 | 1/1966 | Fairbank et al. | 56—208 X |
| 3,363,407 | 1/1968 | Drummond | 56—23 |

ANTONIO F. GUIDA, Primary Examiner